Aug. 22, 1961    R. V. BURT    2,997,187
APPARATUS FOR ARRANGING AND STACKING CONTAINERS
Filed July 19, 1956    8 Sheets-Sheet 1
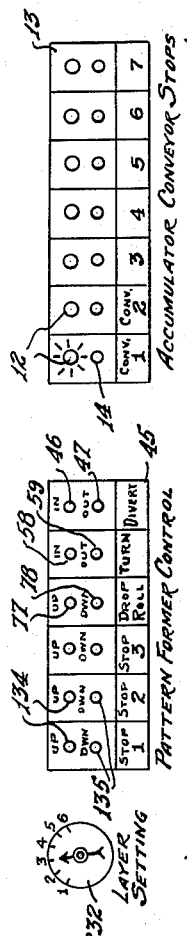
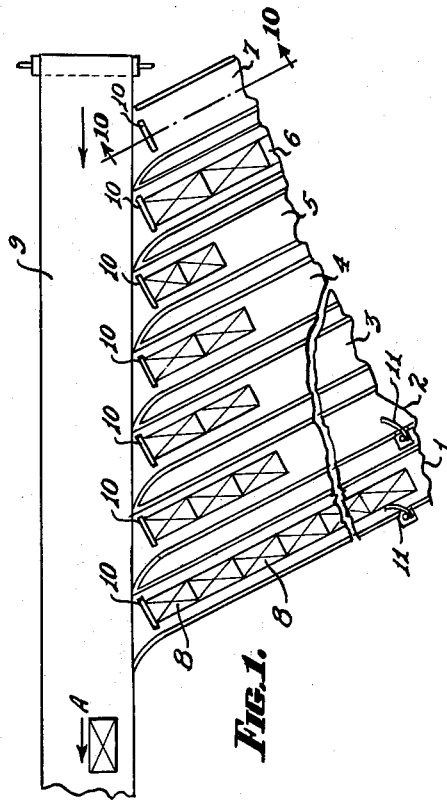
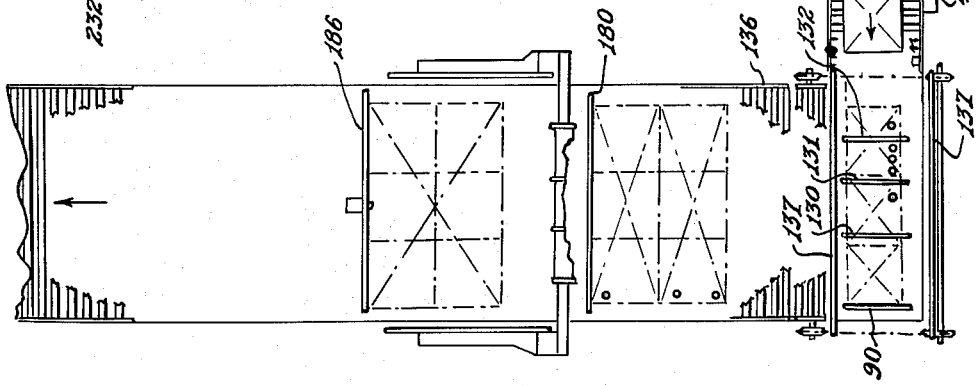
INVENTOR.
ROBERT V. BURT,
BY Allen & Allen
ATTORNEYS.

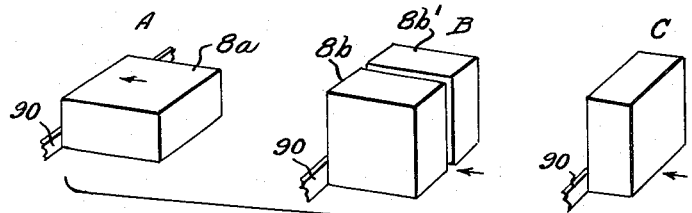
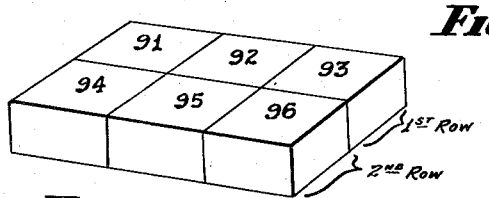
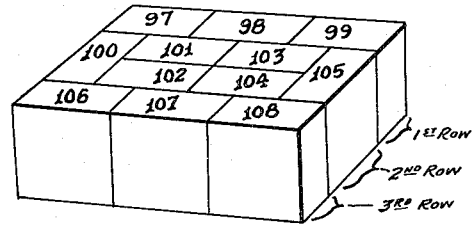
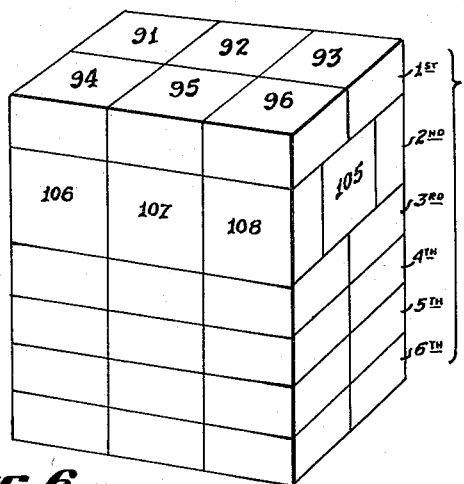
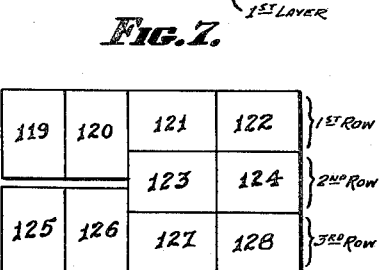
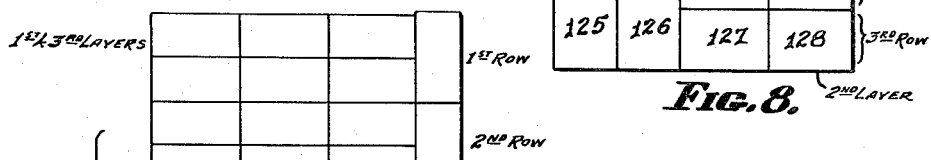
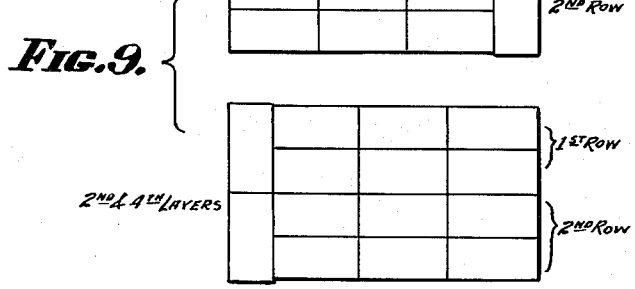

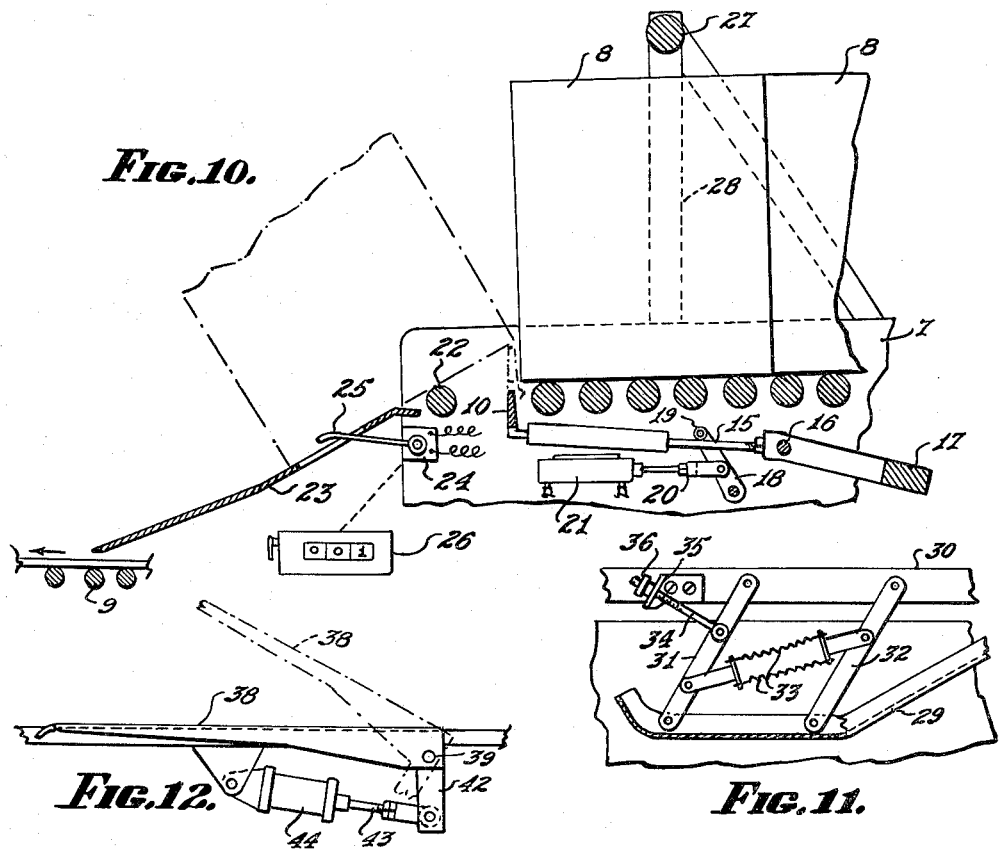

INVENTOR.
ROBERT V. BURT,
BY Allen & Allen
ATTORNEYS.

Aug. 22, 1961 R. V. BURT 2,997,187
APPARATUS FOR ARRANGING AND STACKING CONTAINERS
Filed July 19, 1956 8 Sheets-Sheet 5

INVENTOR.
ROBERT V. BURT,
BY Allen & Allen
ATTORNEYS.

Aug. 22, 1961   R. V. BURT   2,997,187
APPARATUS FOR ARRANGING AND STACKING CONTAINERS
Filed July 19, 1956   8 Sheets-Sheet 6

INVENTOR.
ROBERT V. BURT,
BY Allen & Allen
ATTORNEYS.

Aug. 22, 1961 R. V. BURT 2,997,187
APPARATUS FOR ARRANGING AND STACKING CONTAINERS
Filed July 19, 1956 8 Sheets-Sheet 7

INVENTOR.
ROBERT V. BURT,
BY Allen & Allen
ATTORNEYS.

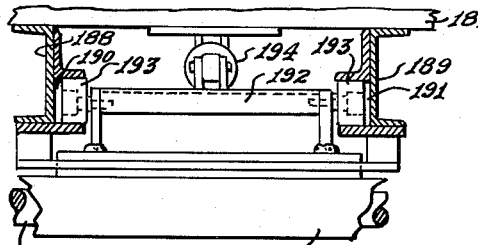
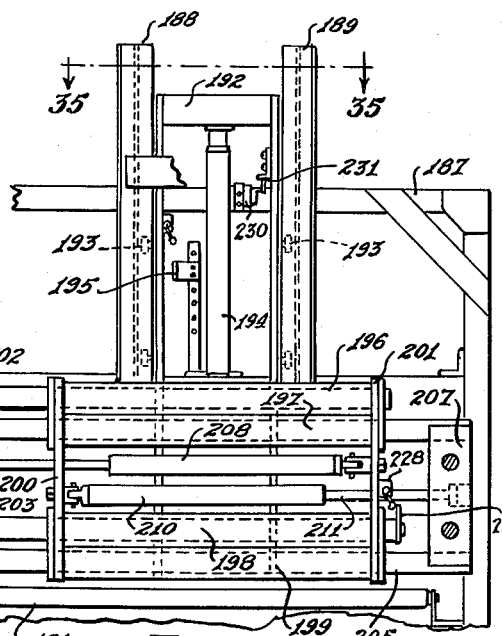
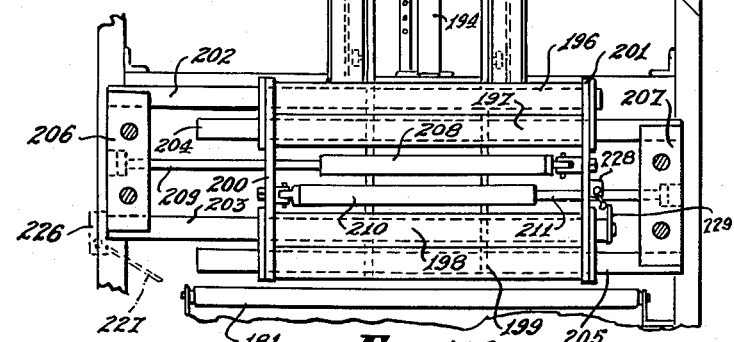
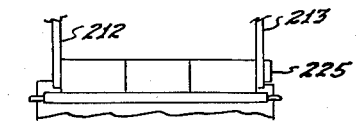
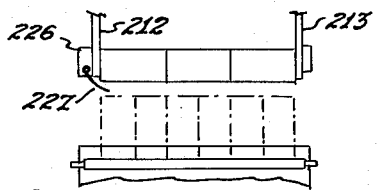
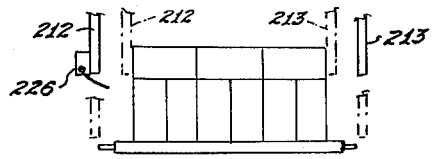
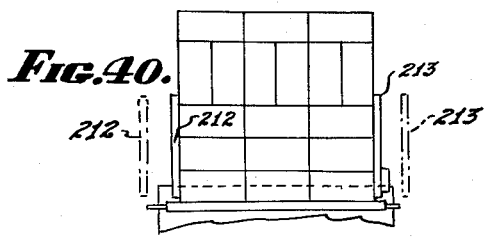

United States Patent Office 2,997,187
Patented Aug. 22, 1961

2,997,187
APPARATUS FOR ARRANGING AND
STACKING CONTAINERS
Robert V. Burt, Cincinnati, Ohio, assignor to The Procter & Gamble Company, Cincinnati, Ohio, a corporation of Ohio
Filed July 19, 1956, Ser. No. 598,817
25 Claims. (Cl. 214—6)

This invention relates to apparatus for arranging and stacking containers and more particularly to a device by means of which a continuous supply of containers may be formed into layers in a desired pattern and a plurality of the layers so formed arranged one upon the other in stacked relation to form a unit load.

In the storage of filled containers such, for example, as shipping cases in which one or more articles or cartons are packed, it is customary to arrange the containers in layers stacked one on the other to form a unit load which can be handled by a mobile truck so that the load may be conveniently moved from place to place. It will be understood that each layer is composed of a plurality of rows of containers and the layers so formed stacked one upon the other to any desired height. In forming a load it is highly desirable that the containers in layers be arranged in different patterns so that an interlocking effect is obtained between some at least of the superposed containers, thereby forming an extremely rigid and stable unit load capable of being easily handled without being upset or tilted.

Various expedients have been hitherto proposed for arranging and stacking containers so that they may be handled as a unit load. Customarily, the unit loads are built up on pallets which provide rigid supporting surfaces for the bottommost layer in the load and at the same time provide carriers by means of which the loads may be lifted and moved from place to place, as by means of a forked lift truck. In building up layers on a pallet, the containers must be stacked one upon the other and this requires that the containers be lifted manually a considerable distance as the stack grows or else container stacking apparatus must be provided which will extend upwardly to a level coextensive with the height of the stack being formed. Alternatively, the stacking may be accomplished by lowering the containers into an opening below the floor level as the successive layers are built up. Here again, the stacking must be done either by hand or by apparatus capable of reaching into the opening and properly positioning each container.

It will be obvious that where the stacks are being formed by manual labor, considerable difficulty will be encountered in raising or lowering the containers to the desired positions, particularly when the weights of filled containers are considered together with the heights to which the containers must be lifted to complete a unit load which may consist of as many as 50 to 60 containers. Where loading machinery is provided to stack the containers, additional difficulties are encountered. Such devices are generally capable of handling only one size of container and if the size is changed, the machinery must be substantially modified in order to handle the new size. Similarly, where the equipment is of a character such that it will automatically arrange the containers into one or more predetermined layer patterns, the device cannot be used to form other or different patterns excepting upon major modifications of its operating components.

Accordingly, it is a principal object of my invention to provide a container arranging and stacking device which will eliminate the difficulties inherent in the prior art practices characterized above as well as provide features and advantages which have heretofore been unknown in the container stacking art.

It is an object of my invention to provide a device for stacking containers wherein all of the layers of containers are formed at the ground or working level, each layer as it is formed being engaged and elevated so that the next successive layer may be formed and positioned beneath the preceding layer, thereby building up the unit load from the ground or working level.

A further object of my invention is the provision of a device which will automatically stack preformed layers of containers into a multiple layer unit load and then transfer the load to a discharge position from which it can be readily moved to a storage area.

A further object of my invention is the provision of a device which will form unit loads and transfer the loads so formed to a take-away position all without the use of any form of pallet or other load supporting device.

Still another object of my invention is the provision of a device of the character described which can be used for stacking a variety of sizes of containers without any modification or alteration of the device.

Still a further object of my invention is the provision of mechanism which will serve to feed and arrange containers in layer forming patterns for subsequent stacking of the layers into an interlocking unit load.

Still a further object of my invention is the provision of container arranging and stacking means wherein a moving supply of containers is first separated to provide space between the containers and then, by means of container positioning mechanisms controlled either by an operator or by automatic control means, the containers are formed into rows and the rows so formed arranged in layers composed of several rows arranged in a predetermined pattern.

Still a further object of my invention is the provision of a device of the character described wherein a set of three container positioning mechanisms make it possible for the operator to form practically any desired layer pattern with the containers positioned either lengthwise or transversely of the layer, or turned over on their sides.

Yet a further object of my invention is the provision of a device which will accumulate, transport, arrange and stack containers in unit loads all without manual labor excepting for the operator controlling the operation of the device.

Yet another obpject of my invention is the provision of a novel procedure for arranging and stacking containers into unit loads which permits the loads to be readily assembled and stacked from a normal working level.

These as well as other objects of my invention which will appear hereinafter or which will be apparent to the skilled worker in the art upon reading these specifications, I accomplish by that construction and arrangement of parts of which I shall now describe an exemplary embodiment.

Reference is now made to the accompanying drawings wherein:

FIGURES 1 and 1a are schematic and diagrammatic plan views illustrating container arranging and stacking apparatus in accordance with my invention.

FIGURE 2 is a diagrammatic front elevational view of a control panel for the apparatus.

FIGURE 3 is a schematic perspective view illustrating various container positions.

FIGURES 4 and 5 are perspective views illustrating layer patterns utilized in the formation of the unit load illustrated in FIGURE 6.

FIGURE 6 is a perspective view of a unit load formed from the container layers of FIGURES 4 and 5.

FIGURES 7, 8 and 9 are plan views illustrating alternate layer patterns.

FIGURE 10 is a vertical sectional view of somewhat diagrammatic nature taken along the line 10—10 of FIGURE 1.

FIGURE 11 is an enlarged fragmentary plan view of the fixed diverter or sweep.

FIGURE 12 is an enlarged fragmentary plan view of the movable diverter.

FIGURE 13 is a side elevational view of the device illustrated in FIGURE 12.

FIGURE 14 is an enlarged fragmentary side elevational view of a turn-around in accordance with my invention.

FIGURE 15 is a sectional view taken along the line 15—15 of FIGURE 14.

FIGURE 34 is a vertical sectional view taken along the line 34—34 of FIGURE 30.

FIGURE 35 is a sectional view taken along the line 35—35 of FIGURE 34.

FIGURES 36 through 40 are diagrammatic elevational views illustrating the sequence of operation of the clamping device.

Figure 16:
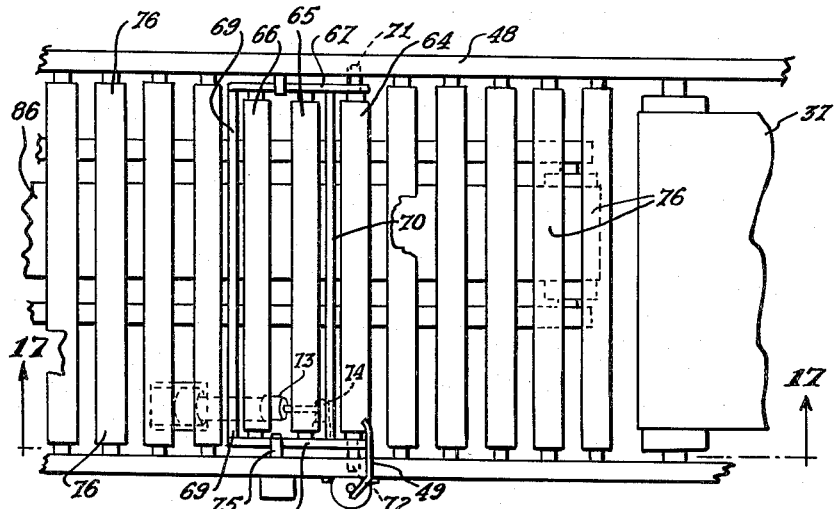
FIGURE 16 is a fragmentary plan view of the leading end of the third section of the delivery conveyor illustrating the drop roller mechanism.

Briefly, in the practice of my invention, I provide a delivery conveyor arranged to selectively receive containers from any one of a plurality of accumulator conveyors which receive and collect the containers from the packing room or other source of container supply. In accordance with my invention, each of the accumulator conveyors may be used for a different size container or for different brands or kinds of products. At its discharge end, each accumulator is provided with a retractable stop under the control of the operator for selectively discharging containers from any given accumulator onto the delivery conveyor. Suitable counting means are provided to limit the discharge to a predetermined number of containers which will make up a unit load.

As the containers are being moved along the delivery conveyor, they are first acted upon by a fixed diverter effective to position the containers in a single aligned row. The aligned containers are then passed onto a speed-up conveyor section operating at a lineal speed substantially in excess of the lineal speed of the delivery conveyor and serving to space apart adjacent containers so that they may be individually acted upon by pattern forming means effective to arrange the individual containers on the conveyor in any one of a plurality of positions. Preferably there are three pattern formers. The first comprises a movable diverter in the form of a retractable sweep which may be utilized to displace the containers laterally, thereby positioning the diverted containers in a row displaced laterally of the original row. By means of the movable diverter the containers may be selectively arranged in parallel rows extending in their original direction of movement. Beyond the movable diverter a retractable turn-around is provided which, when extended, provides an abutment against which a leading corner edge of a container in the first row will come into contact, the continuing movement of the conveyor acting to swing the container at right angles to its original position, thereby permitting a container to be advanced in a transversely disposed or turned around position. Preferably, at this stage the conveyor will be in the form of a live roller conveyor so that a drop roller section may be provided somewhat beyond the turn-around, the drop rollers being effective when in lowered position to trip or turn over the containers on their sides. Operator actuated control means will be provided for the movable diverter, the turn-around and the drop rollers so that the advancing containers may be selectively positioned by the operator in accordance with a particular layer pattern to be formed.

Beyond the drop rollers the arranged containers are moved against a fixed stop or abutment extending transversely of the conveyor, the stop serving to collect the containers in rows each composed of a predetermined number of containers. As the rows are formed they are automatically contacted by a pusher which removes them from the delivery conveyor and deposits them on a second conveyor section where the rows are formed into layers. A layer is assembled by collecting a plurality of rows against a retractable stop. Generally speaking, a layer will be composed of two or three rows each of which is at least three containers long. Of course, depending upon the size of the containers and the pattern being followed, numerous variations in the number of containers making up the individual rows and layers may be made.

Upon the formation of a complete layer, the retractable stop against which the layer is formed will be actuated to release the layer and permit it to advance along the second conveyor section to a second retractable stop which is positioned to stop the layer beneath a pair of movable clamping jaws. Upon positioning of the layer beneath the jaws, the jaws are actuated to enter into gripping engagement with the opposite sides of the layer, whereupon the jaws are elevated, thereby lifting the entire layer upwardly. It will be understood that the clamping force of the jaws is sufficient to hold the containers together as a unit without crushing them.

While the first layer is being clamped and lifted, the second layer will have been assembled against the first retractable stop and delivered beneath the clamp just after the clamp has elevated the first formed layer. Thereafter, the clamp is actuated to lower the first layer until it rests upon the second layer, whereupon the jaws of the clamp expand, move downwardly and inwardly so as to engage the second or undermost layer, whereupon the assembly of two layers is jointly elevated by the clamp. By this time a third layer will have been formed and positioned for engagement by the clamp. The stack will thus be built up from beneath to the desired number of layers.

Upon the building up of the stack to the desired number of layers, the clamp will lower the stack—now in the form of a unit load—onto the second conveyor and release it, whereupon the second retractable stop is actuated to free the load and permit it to move beyond the clamping mechanism for delivery to a discharge station.

Referring now to FIGURES 1 and 1a of the drawings wherein I have diagrammatically shown an apparatus in accordance with my invention, a plurality of accumulator conveyors numbered 1 through 7 are arranged to deliver containers 8 to a delivery conveyor 9 adapted to be moved in the direction of the arrow A. The number of accumulator conveyors employed does not constitute a limitation on my invention and the number may be varied to meet the requirements of use. Generally speaking, a separate accumulator conveyor will be used for each size of container to be stacked or to distinguish between various kinds of articles packed in the containers. Similarly, the nature of the accumulator conveyors does not constitute a limitation on my invention, although I prefer to utilize gravity or chute conveyors along which the containers may slide. In a factory installation the accumulator conveyors may be conveniently arranged to deliver the containers from the packing room or other source of container supply.

A stop 10 is located at the foot or discharge end of each accumulator conveyor, the stops being arranged to normally close the discharge ends of the conveyors so that a supply of containers may be built up. To this end, counting means 11 are provided to indicate to the operator when a sufficient number of containers has been accumulated on any given conveyor to form a unit load. The counting means may be in the form of a switch effective to illuminate an indicator light 12 on a control panel 13 (FIGURE 2), the arrangement of parts being such that the switch will be moved to the closed position and retained there by the last carton required to make up the unit load. The operator may then press the release button 14 on the control panel to release the stop and discharge the containers onto the conveyor.

As best seen in FIGURE 10, each of the stops 10 may be mounted on an arm 15 projecting rearwardly beneath the conveyor, the arm being pivoted about a pivot point 16. A counter weight 17 serves to normally bias the stop 10 upwardly into container engaging position. The stop is lowered by means of an arm 18 having a roller 19 at one end thereof movable along the arm 15, the arm 18 and roller 19 being operatively connected through a link 20 to an actuating device 21 which is energized when the release button 14 is pressed by the operator. The actuating device illustrated is in the form of a pneumatic cylinder, although a solenoid or other similar means for moving the arm 18 could be provided.

Upon downward movement of the stop 10 the containers will move by gravity from the accumulator conveyor to the delivery conveyor, and to facilitate the transfer one or more free moving rollers 22 and a slide extension 23 may be provided to effect a smooth transfer. As the containers leave the discharge end of the accumulator conveyor they will be counted by means of a counting device 24 having an arm 25 which will be depressed by each container as it passes over the arm. If desired, a counting mechanism 26 may be provided to indicate the number of containers discharged. The counting device 24 will be operatively connected to the actuating device 21 so that the stop 10 will be raised upon the discharge of a predetermined number of containers onto the delivery conveyor 9. The counting device will be set in accordance with the number of containers required to make up a unit load. With this arrangement, once the operator has pressed the release button 14 for any given accumulator conveyor, the feeding of the required number of containers onto the delivery conveyor will be accomplished automatically.

When the stop 10 is in the raised position, as illustrated in dotted lines in FIGURE 10, there is some danger that the first container delivered against the raised stop will tilt forwardly due to its momentum and, possibly, fall from the accumulator conveyor. To prevent this, I have provided a trip rod 27 extending transversely of the accumulator conveyor and spaced upwardly from the upper surfaces of the containers, the arrangement being such that should the leading container on the conveyor tip forwardly as it strikes the stop, the rear portion of its upper surface will strike the trip rod 27, thereby preventing the carton from pitching forwardly over the stop. The trip rod will be supported on suitable supporting posts 28 which may be made adjustable if desired.

Referring again to FIGURE 1a, the containers upon being deposited on the delivery conveyor 9 will be moved along and initially acted upon by a fixed diverter or sweep 29 which acts to arrange the containers in an aligned row along one side of the conveyor. This positions the containers to be acted upon by the pattern forming means. As best seen in FIGURE 11, the diverter is pivotally mounted to the side frame 30 of the conveyor by means of parallel arms 31 and 32 interconnected by tension springs 33. The diverter may be adjusted by means of a threaded rod 34 connected to the arm 31, the threaded rod passing freely through an opening in an ear 35 projecting upwardly from the machine frame, there being a thumb screw 36 for contact with the ear. This arrangement permits adjustment of the sweep and at the same time resiliently mounts it to absorb the impact of the containers as they are moved against the sweep.

Immediately beyond the sweep the containers pass onto a second section 37 of the conveyor. This section, as the first, may be a belt conveyor although it will be operated at a lineal speed greater than that of the conveyor 9, thereby causing the containers to be spaced apart. By way of example, the conveyor 9 may be operated at a lineal speed of 40 feet per minute, whereas the conveyor section 37 may be operated at a lineal speed of 120 feet per minute. While on the second conveyor section, the containers may be selectively acted upon by the first of the pattern forming means.

A movable diverter in the form of a pivoted sweep arm 38 is mounted along one side of the conveyor, the sweep arm being movable from an inoperative or "out" position to an operative or "in" position, the two positions being illustrated in solid and dotted lines, respectively, in FIGURE 1a. The function of the sweep is to divert the containers laterally of the conveyor section when in the "in" or operative position, thereby permitting the operator to position the advancing containers in either of two side-by-side rows. It will be apparent that when the diverter is in the "out" or inoperative position, the containers will pass beyond it in the original row formed by the sweep 29.

As best seen in FIGURES 12 and 13, the sweep 38 may be pivotally mounted at one end on a shaft 39 journaled in brackets 40, 41 secured to the machine frame. The sweep has an extension 42 in the form of a bell crank to the free end of which the piston rod 43 of a pneumatic cylinder 44 is secured. Upon actuation of the pneumatic cylinder the sweep may be moved from one position to the other. The cylinder will be actuated from the pattern former control panel 45 which, as seen in FIGURE 2, is provided with control buttons 46 and 47 for the "in" and "out" positions of the diverter. Suitable electrical and pneumatic circuits within the knowledge of the skilled worker in the art will be provided to actuate the cylinder 44 when either of the control buttons is pressed. As before, the pneumatic cylinder may be readily replaced by a solenoid or other actuating means effective to move the diverter sweep.

Upon passage of the containers beyond the sweep 38 they will enter a third conveyor section 48 which, preferably, is in the form of a live roller conveyor. In this section the containers in the first or initial row, i.e. the row adjacent the side edge of the conveyor, may be selectively acted upon by a turn-around 49 which, in its "in" position, provides an abutment for contact by an edge portion of the advancing container, the abutment serving to turn the container at right angles to the direction of flow. When in the "out" or inoperative position, the containers may pass beyond the turn-around in their original aligned position. As best seen in FIGURES 14 and 15, the turn-around may comprise a plate or abutment 50 secured along one side to a vertically disposed shaft 51 journaled in brackets 52 and 53 mounted to the conveyor frame. The turn-around is normally biased to the inoperative position, illustrated at 50a in dotted lines (FIGURE 15), by means of a tension spring 54 connected at one end to the conveyor frame and at the other end to a crank arm 55 fixed to the shaft 51. A solenoid 56 for moving the abutment to the "in" position is mounted in opposition to the spring 54, being connected to the crank arm 55 by means of a link 57. The solenoid will be actuated from the pattern former control panel 45 by means of the control buttons 58 and 59 (FIGURE 2). I have found it desirable to cushion the abutment 50 against the impact of the containers by means of a compression spring 60 surrounding a headed bolt 61 and extending between the head of the bolt and a bolt supporting bracket 62.

Figure 17:
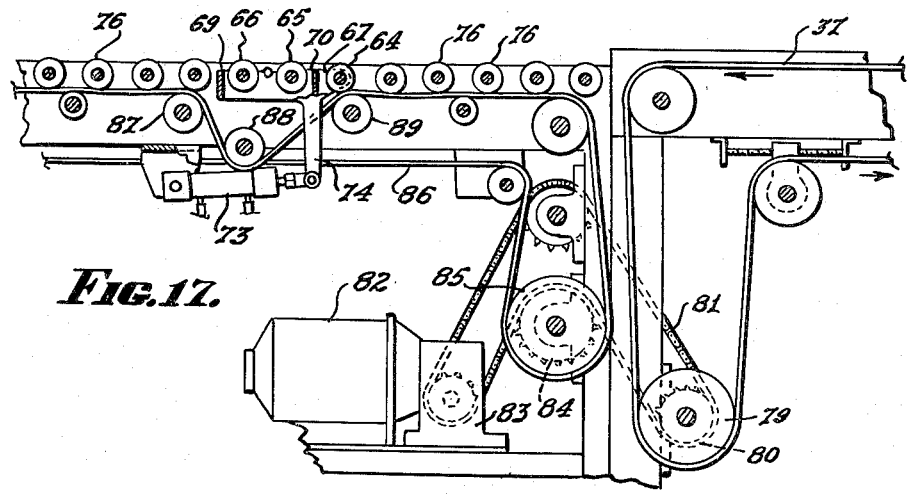
FIGURE 17 is a vertical sectional view taken along the line 17—17 of FIGURE 16.
Figure 18:
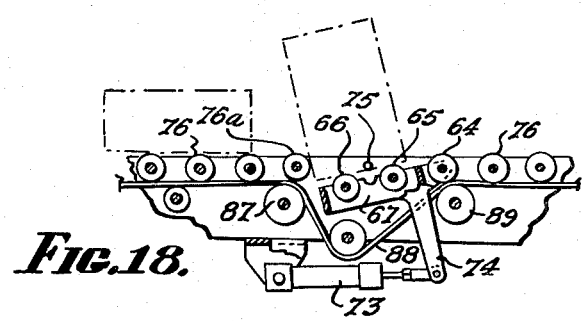
FIGURE 18 is a fragmentary sectional view similar to FIGURE 17 but illustrating the drop rollers in an alternate position of use.

Immediately beyond the turn-around I provide a section of drop rollers 63 by means of which the turned around containers may be selectively turned on their sides. As best seen in FIGURES 16, 17 and 18, the drop rollers 65 and 66 will be mounted in a frame composed of side plates 67, 68 connected together by bars 69 and 70, the frame so formed being pivoted to the conveyor frame by means of pins 71 and 72 in alignment with the axis of the pivot roller 64. The two drop rollers are pivotally movable from the "up" position illustrated in FIGURE 17 to the "down" position illustrated in FIGURE 18. The drop rollers are raised and lowered by means of a pneumatic cylinder 73 the piston of which is connected to an arm 74 projecting downwardly from the drop roller frame. A stop 75 will serve to limit upward movement of the drop rollers and maintain them in alignment with the main bank of rollers which are designated by the reference numeral 76. It will be obvious from FIGURE 17 that when the drop rollers are in the "up" position, the containers will move over the drop rollers as if they were simply part of the main bank of rollers. If, however, the rollers are lowered, as illustrated in FIGURE 18, an advancing container will travel downwardly with the inclined drop rollers until its leading edge strikes against the roller 76a which acts as a trip to turn over the container so that it will then advance on its side. As in the case of the other pattern forming means, the pattern former control panel 45 will be provided with control buttons 77 and 78 to actuate the cylinder 73 controlling the movement of the drop rollers.

FIGURE 17 will also serve to illustrate the manner in which the conveyor sections are driven. As seen therein, the second conveyor section 37 is driven from a drive roller 79 having a sprocket 80 about which an endless chain 81 passes. The chain is driven by a prime mover 82 through the intermediary of reduction gearing generally indicated at 83. The endless chain also serves to drive a sprocket 84 for a drive roller 85 about which passes an endless belt 86. This belt acts to drive the rollers 76 making up the live roller conveyor; and it will be noted that the belt is arranged to bypass the drop roller section, the belt passing around take-up rollers 87, 88 and 89. Preferably, however, the arrangement will be such that the pivot roller 64 will be driven, as will be clear from FIGURES 17 and 18.

With the three pattern forming units just described, either mechanically, hydraulically or electrically controlled, it is possible to form substantially any arrangement of containers at the will of the operator. In this connection it will be noted that the control panels 13 and 45 are located immediately to one side of the pattern forming units where he can readily observe the containers as they are being arranged. Upon passage of the containers beyond the pattern forming means, the now arranged containers are collected into rows against a fixed stop 90 at the far end of the live roller conveyor.

Referring now to FIGURE 3 of the drawings, I have therein illustrated the various possible positions in which the containers may be formed for collection against the stop 90. As seen at A in FIGURE 3, a container 8a may be delivered in turned over condition. A pair of containers 8b and 8b' are shown at B, the containers being delivered in upright position in side-by-side rows. While the containers have been shown as a side-by-side pair, it will be understood that they will have been delivered successively in indifferent order. At C, I have shown a container delivered in turned around or sidewise position.

FIGURES 4, 5 and 6 illustrate the manner in which a typical load may be made up. FIGURE 4 illustrates the first layer of the load which is composed of six cases laid on their sides in two rows of three each. The first formed row is composed of cases 91, 92 and 93 which will be formed by first turning them around by means of the turn-around 49, whereupon they will be turned over on their sides by means of the drop rollers 63. As will be explained more fully hereinafter, subsequent to the formation of the first row it will be pushed to a collecting station whereupon the second row, composed of containers 94, 95 and 96 will be formed and moved to the collecting station beside the first row. As will be evident from FIGURE 6, the first and third through sixth layers of the unit load are formed in this manner. In the second layer, on the other hand, the containers are positioned upright with some of them at right angles to others and arranged in different positions across the width of the layer to form an interlocking unit of approximately the same dimensions as the other layers. Thus, as seen in FIGURE 5, the second layer may be composed of three rows, the first of which is made up of containers 97, 98 and 99 arranged in upright end-to-end relation. The second row has first container 100 turned at right angles to the containers in the first row, followed by side-by-side pairs of containers 101, 102 and 103, 104. A sidewise disposed container 105 abutting against the ends of the containers 103 and 104 completes the row. The third row is identical with the first and is composed of end-to-end containers 106, 107 and 108.

It will be understood that diverse patterns may be formed utilizing the pattern forming means of the instant invention. A typical example has already been given. FIGURES 7 and 8 illustrate an alternate pattern wherein the alternate layers in a unit load could be made up as therein illustrated. Thus, in FIGURE 7, the first layer would compose a first row made up of containers 109, 110, 111 and 112, the second row being made up of containers 113 and 114, and the third layer composed of containers 115, 116, 117 and 118.

The alternate layer, shown in FIGURE 8, is composed of a first row made up of containers 119, 120, 121 and 122. The second row is composed of the containers 123 and 124, whereas the third row is made up of containers 125, 126, 127 and 128.

FIGURE 9 illustrates yet another arrangement of containers wherein the layers are each composed of two rows of containers, although in this instance each of the layers is two containers wide.

In addition to the fixed stop 90 at the end of the live rollers conveyor, I provide a plurality of retractable stops, such as the stops 130, 131 and 132 positioned at spaced apart intervals in advance of the stops 90. The purpose for these additional stops is to permit the operator to form what may be termed short rows of containers. Thus, with reference to the layer formation shown in FIGURE 8 of the drawings, the second row therein is composed solely of the containers 123, and 124, and their relationship to the remainder of the rows is such that they would have to be formed into a row and removed from the conveyor at a point in advance of the fixed stop 90. Consequently, in order to form the containers 123 and 124 in the proper position, the operator would raise one of the retractable stops, such as the stop 131, and collect the containers against this stop rather than against the stop 90. As in the case of the other selectively operable elements, the retractable stops will be controlled from the control panel 45 by means of suitable "up" and "down" push buttons 134 and 135. It will be understood that as the rows are formed they are immediately pushed from the live roller conveyor 48 onto a second live roller conveyor 136 (FIGURE 1a) extending at right angles to the conveyor section 48, the rows of containers being pushed from one conveyor to the other by means of pusher bars 137 arranged to sweep transversely across the row collecting end of conveyor section 48.

Figure 19:
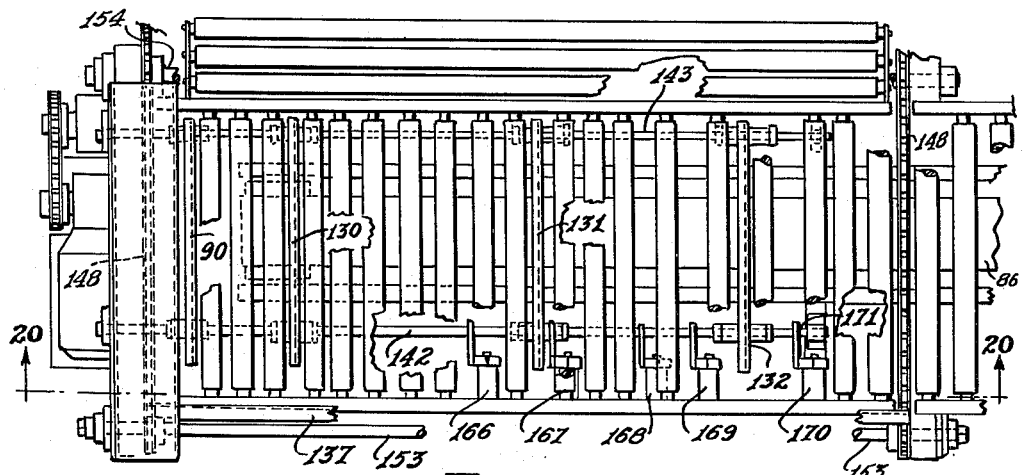
FIGURE 19 is a plan view of the row collecting end of the third section of the delivery conveyor.
Figure 24:
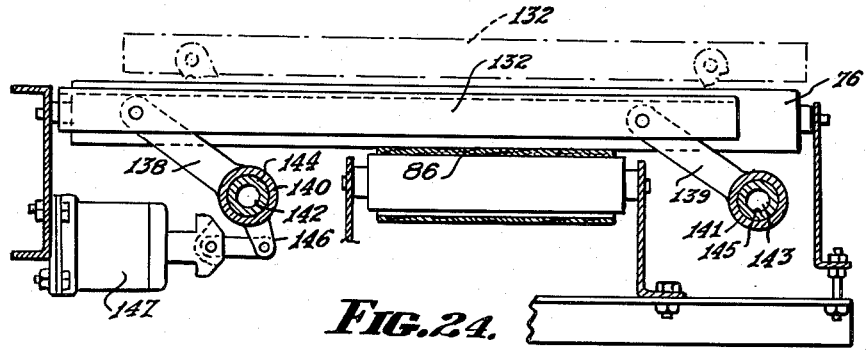
FIGURE 24 is a vertical sectional view taken along the line 24—24 of FIGURE 20.

The mounting of the retractable stops can be best understood by reference to FIGURE 24 wherein the stop 132 is shown pivotally mounted on swinging fingers 138 and 139 which terminate in collars 140 and 141 surrounding common shafts 142 and 143 extending lengthwise of the conveyor, as can be best seen by reference to FIGURE 19. Suitable bushings 144 and 145 provide for rotary movement of the fingers relative to the shafts. The finger 138 carries an extension 146 to which the solenoid 147 is connected. Actuation of the solenoid upon pressing of the push button 134 by the operator will cause the finger 138 to swing upwardly, thereby causing the stop 132 to be raised to the position illustrated in dotted lines.

Figure 20:
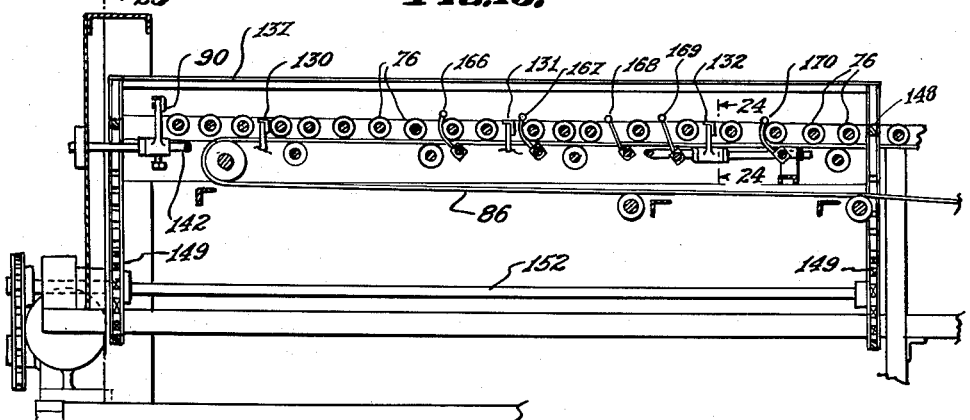
FIGURE 20 is a vertical sectional view taken along the line 20—20 of FIGURE 19.
Figure 25:
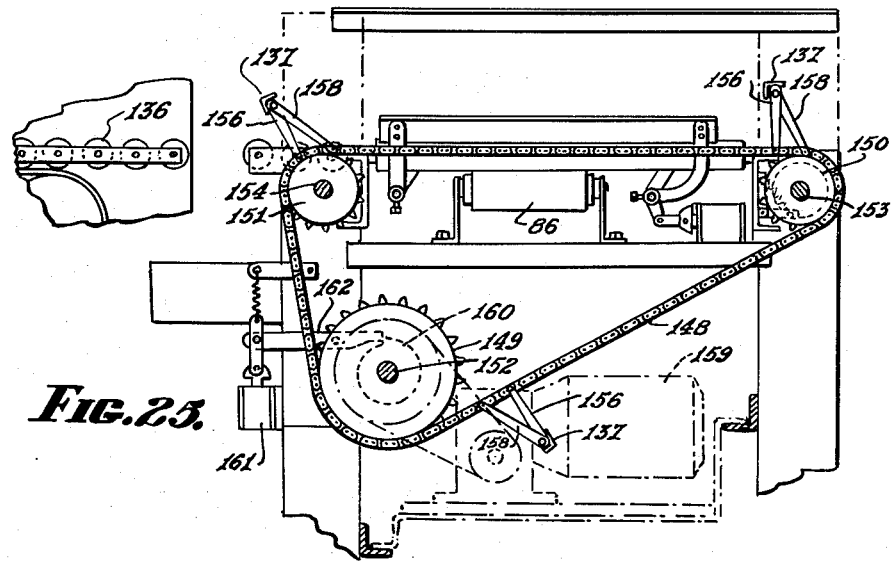
FIGURE 25 is a vertical sectional view taken along the line 25—25 of FIGURE 20.

Referring now to FIGURES 19, 20 and 25, the pusher bars 137 are moved across the end of the conveyor section 48 by means of pairs of endless chains 148 passing around sets of sprockets 149, 150 and 151 mounted on shafts 152, 153 and 154, respectively, journaled in the conveyor frame. The manner in which the pusher bars are secured to the chains can be best seen in FIGURES 27 and 28 wherein the pusher bars are shown in the form of angle irons having outwardly projecting pivot pins 155 at their ends supported by spaced apart pairs of supports 156 and 157 pinned at their lower ends to the length of the chain 148. Braces 158 serve to rigidify the supports 156 and 157. As will be clearly evident from FIGURE 25, the mounting of the pusher bars is such that they will clear the fixed stop 90 as well as any of the retractable stops when in the "up" position.

The pusher bars are driven by a prime mover 159 which, acting through a single revolution clutch 160, serves to drive the chains 158 in increments to advance successive pusher bars across the end of conveyor section 48 and deliver the collected rows of containers to the second conveyor. The single revolution clutch is under the control of a solenoid 161 which, upon being energized, trips lever 162 to release the clutch for a single revolution.

Figures 26, 27, 28:
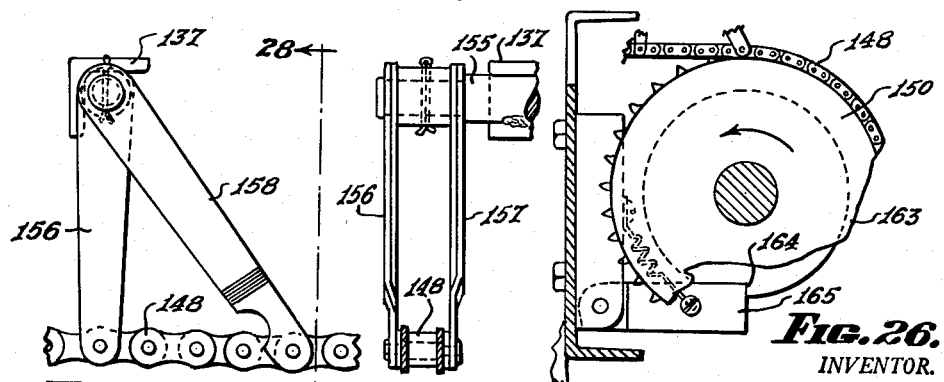
FIGURE 26 is an enlarged detailed view of a portion of the mechanism illustrated in FIGURE 25.
FIGURE 27 is an enlarged side elevational view of one of the pusher bars illustrated in FIGURE 25.
FIGURE 28 is an end elevational view taken along the line 28—28 of FIGURE 27.

In order to prevent back lash of the pusher bars after the single revolution clutch has run through its cycle, I prefer to provide the sprocket wheel 150 with an antiback lash device of the character illustrated in FIGURE 26. As seen therein, the sprocket wheel 150 may be provided with a shoulder 163 having a notch 164 into which a spring biased ratchet arm 165 is adapted to seat upon one revolution of the chain driven clutch. In order for the device to back lash, it will be necessary for the sprocket 150 to rotate in a clockwise direction, i.e. in a direction opposite to the direction of movement of the pusher bars, and any attempt to do this will be resisted by the ratchet arm which will have seated in the notch 164.

Instead of being actuated from the operator control panels, the solenoid 161 controlling the movement of the pusher bars is automatically actuated by the containers as they are formed into rows on the end of the conveyor section 48. To this end, and with reference to FIGURES 19 and 20 of the drawings, the conveyor section is provided with a series of row length limit switches 166, 167, 168, 169 and 170 projecting upwardly between the conveyor rollers at predetermined intervals. As a row of containers is built up on the conveyor, the containers will successively close the limit switches and, when all or a predetermined series of the switches are closed, a circuit will be completed effective to actuate the solenoid 161 and thereby push the completed row to the second conveyor for collection into a layer.

Figure 21:
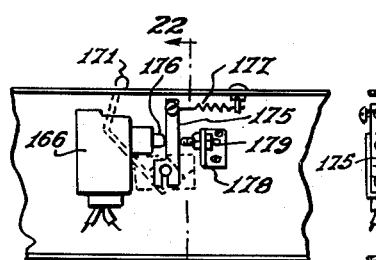
FIGURE 21 is an enlarged fragmentary side elevational view of limit switch means used in conjunction with the conveyor section of FIGURES 19 and 20.
Figure 22:
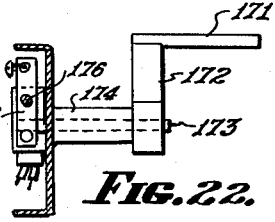
FIGURE 22 is a vertical sectional view taken along the line 22—22 of FIGURE 21.
Figure 23:
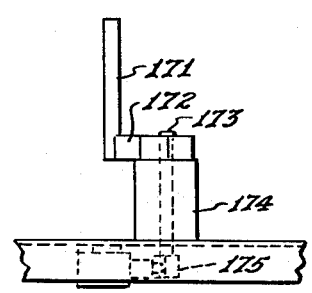
FIGURE 23 is a plan view of the switch means illustrated in FIGURE 21.

As best seen in FIGURES 21, 22 and 23, each of the limit switches, such as the switch 166, may be provided with a container contacting arm 171 extending parallel to the conveyor rollers and elevated somewhat above the upper surfaces thereof. A downwardly projecting extension 172 of the arm connects it to a pivot pin 173 passing through a spacer block 174. A contact bar 175 is connected to the opposite end of the pin 173 and arranged, upon rocking movement of the pin caused by depression of the container contacting arm 171, to press against the contact button 176 of the switch. A spring 177 normally biases the container contacting arm 171 to the elevated position, such position being determined by means of a bracket 178 mounting an adjustment screw 179.

As already indicated, suitable circuit means will be provided to actuate the solenoid 161 when all or various combinations of the limit switches are closed. To this end, it may be observed that where the retractable stops 130, 131 and 132 are utilized, suitable circuit means may be provided to bypass or close any of the limit switches between a raised retractable stop and the fixed stop. Thus, for example, should the retractable stop 131 be raised, in which event no container could pass beyond it to contact the limit switch 166, the circuit for the retractable stop could include circuit means effective to bypass the limit switch 166.

Upon movement of the formed rows of containers to to the second conveyor 136, they will be moved forwardly until they come to rest against a retractable stop 180. This stop defines a layer collecting station at which a plurality of rows formed on the first conveyor and transferred to the second by the pusher are made up into layers such as those illustrated in FIGURES 4, 5, 7, 8 and 9 of the drawings.

Figure 29:
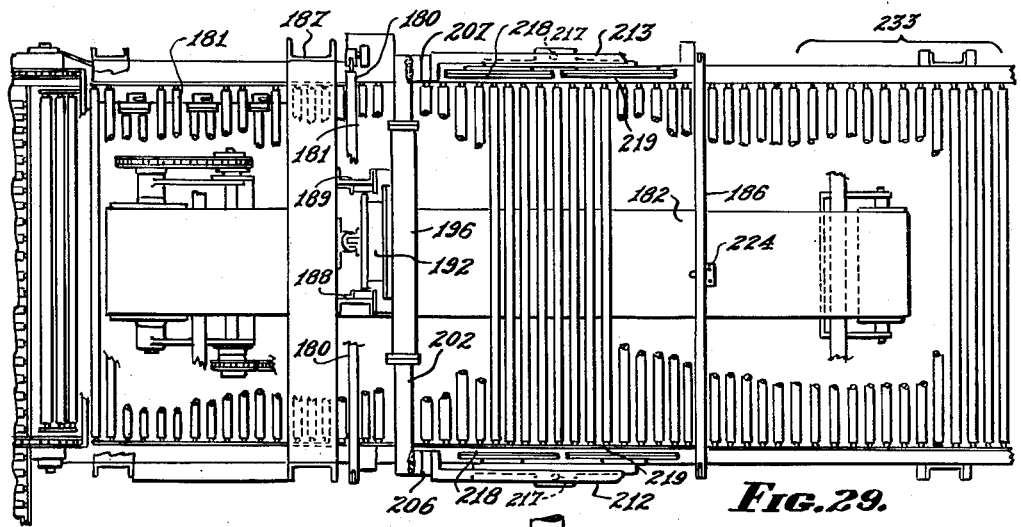
FIGURE 29 is a plan view of the second live roller conveyor and clamping device.

Referring now to FIGURE 29 of the drawings, the retractable stop 180 will be mounted in much the same manner as the retractable stops 130, 131 and 132, being positioned between adjacent rollers 181 making up the second roller conveyor. The rollers will be driven from beneath by means of a drive belt 182, as should now be perfectly clear.

Figure 33:
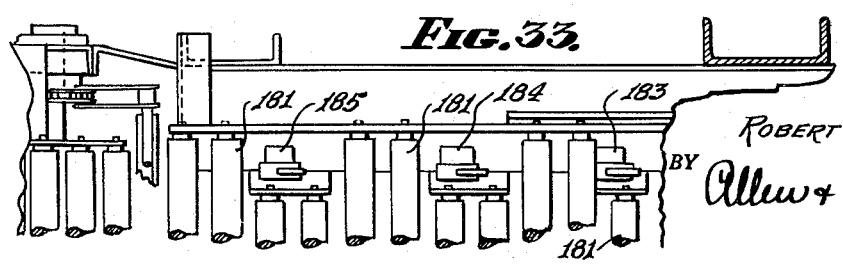
FIGURE 33 is an enlarged fragmentary plan view of a portion of the roller conveyor illustrated in FIGURE 29.

Actuation of the stop 180 so as to lower it is controlled by a series of limit switches 183, 184 and 185 shown in FIGURE 33 arranged lengthwise of the second conveyor in spaced apart relation in advance of the stop 180. The construction of these switches will be similar to that of the limit switches 166–170, although they need not be provided with the elongated container contacting arm 171. Preferably, there will be one limit switch for each row required to make up a layer; and the arrangement of the switches will be such that a circuit will be completed effective to retract the stop 180 when a complete layer of containers is formed. Upon retraction of the stop 180, the formed layer of containers will be free to advance along the second roller conveyor to yet another stop 186 which defines a stacking station at which the formed layers of containers are bodily lifted and stacked one upon the other.

Projecting upwardly above the second live roller conveyor is a supporting frame 187 which mounts a pair of spaced apart vertically disposed masts 188 and 189. As best seen in FIGURES 34 and 35, the masts are provided with vertical channels 190 and 191 in which a frame 192 is movably mounted by means of rollers 193 slidable in the channels 190 and 191. The frame 192 is movable by means of a hydraulic cylinder 194 from a lower position, such as that seen in FIGURE 30 in which the frame lies just above the roller conveyor 136, to an upper or elevated position determined by the adjustable stop 195.

Adjacent its lower end the frame 192 mounts pairs of horizontally disposed tubular sleeve members 196, 197, 198 and 199 secured at their ends to end plates 200 and 201. Pairs of slidable rods 202, 203 and 204, 205 are slidably received in the tubes 196, 198 and 197, 199, respectively, the said pairs of slidable rods being connected at their ends by clamp mounting members 206 and 207. A hydraulic cylinder 208 is secured at one end to the end plate 201 with its piston rod 209 operatively connected to the clamp mounting member 206, thereby permitting the clamp mounting member to be moved in and out. Similarly, the clamp mounting member 207 is provided with a hydraulic cylinder 210 having a piston rod 211 arranged in opposition to the hydraulic cylinder 208, as will be clear from FIGURE 34.

Figures 31, 32:
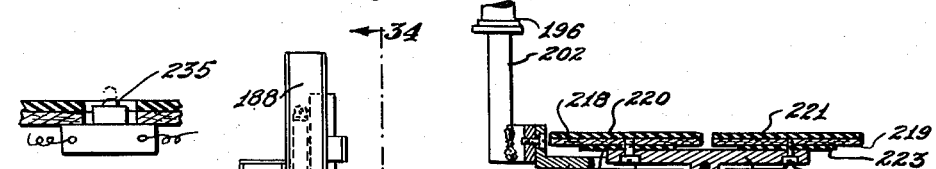
FIGURE 31 is an enlarged sectional view taken along the line 31—31 of FIGURE 30.
FIGURE 32 is an enlarged fragmentary sectional view taken along the line 32—32 of FIGURE 30.
Figure 30:
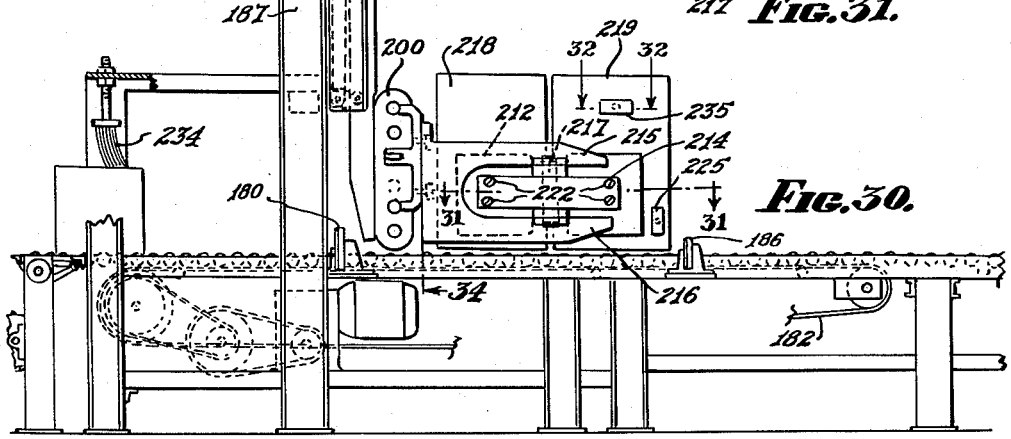
FIGURE 30 is a side elevational view of the device illustrated in FIGURE 29.

The clamp mounting members 206 and 207 mount forked clamping arms or jaws 212 and 213. As best seen in FIGURES 30 and 31, each of the clamp arms, such as the clamp arm 212 illustrated therein, mounts a bracket member 214 between its forked arms 215 and 216, the bracket member being pivotally articulated relative to the clamp arms by means of a vertical pivot pin 217. The bracket 214 in turn mounts a pair of clamping plates 218 and 219 of a size to contact and engage a plurality of layers of containers to be stacked. As best seen in FIGURE 31, the plates 218 and 219 will preferably have rubber or other similar slip resistant faces 220, 221 and it is desirable to mount the plates in such fashion that they will be capable of moving somewhat relative to the bracket member 214 to which they are secured. Thus the plates may be mounted as by means of pairs of studs 222, there being flexible or resilient pads 223 sandwiched between the brackets 214 and the plates 218 and 219. By means of this arrangement, the plates are non-rigidly mounted with respect to the clamp arms 212 and 213 and hence are articulated for some adjusting movement to more closely accommodate them to the end surfaces of the one or more layers being lifted by the clamps.

The clamping device will be actuated and started through its cycle of operation by a layer of containers as it is delivered by the second roller conveyor against the retractable stop 186. This stop is provided with a limit switch 224 (FIGURE 29) which is closed upon contact by the layer of containers delivered thereagainst. Initially, the jaws of the clamp will be in their lowermost position, i.e. the frame 192 will be in the position illustrated in FIGURE 30 and the jaws will be spread apart by the action of the hydraulic cylinders 208 and 210 pushing the clamp mounting members 206 and 207 outwardly. The closing of the limit switch 224 will cause the hydraulic cylinders 208 and 210 to move the clamp mounting members 206 and 207 inwardly, thereby bringing the clamping plates or jaws against the opposite side edges of the layer to be lifted. This action is diagrammatically illustrated in FIGURES 36 and 37, the former showing the position of the jaws at the time the limit switch is contacted and the latter showing the jaws in their inward or clamping position. As the jaws come into clamping engagement with the layer of containers, a limit switch 225 (FIGURES 30, 36 and 37) is closed, and this switch serves to actuate the hydraulic cylinder 194 which lifts the frame 192 and with it the clamping jaws. The upward movement of the jaws will be sufficient to elevate the engaged layer of containers by a distance sufficient to permit the next succeeding layer to be delivered against the stop 186 immediately beneath the layer engaged by the clamp. It will be understood that the inward or clamping movement of the jaws will be preset so that the jaws will clamp under uniform pressure.

As the next succeeding layer is delivered to the stacking station and contacts the limit switch 224, the piston 194 will be actuated to move the frame 192 downwardly, thereby lowering the lifted layer. As the lifted layer is lowered a limit switch 226 having a projecting finger 227 will contact the underlying layer of containers just as the jaws bring the elevated layer into contact with the underlying layer. This action is diagrammatically illustrated in FIGURE 38. In this connection, it may be pointed out that the finger 227 of the limit switch 226 will be positioned so that it will lie just beneath the lower surface of the elevated layer where, upon contact with the underlying layer, it will serve to stop the downward movement of the jaws by deactivating the hydraulic cylinder 194 and at the same time activating the hydraulic cylinders 208 and 210 to move the clamp jaws outwardly, the jaws thus moving to the position illustrated in FIGURE 39. This results in the lifted layer being freed from gripping engagement by the jaws and it is now rested upon the underlying layer.

As the jaws move outwardly to the position illustrated in FIGURE 39, a limit switch 228 (FIGURE 34) will be closed, the limit switch being contacted by a projection 229 carried by the slidable rod 203. Closing of the limit switch 228 serves to again activate the hydraulic cylinder 194 which then moves the frame and clamping jaws downwardly to their lower most position, such position being illustrated in dotted lines in FIGURE 40. As the frame arrives at its lowermost position, yet another limit switch 230 mounted on the supporting frame 187 will be closed by the abutment 231. The closing of this limit switch will serve to actuate the hydraulic cylinders 208 and 210 to move the clamp jaws inwardly for engagement with the superposed layers and, as before, the limit switch 225 will be closed to cause the two layers to be jointly elevated so that a third layer may be fed beneath them and the cycle of operation repeated. A limit switch 235, as shown in FIGURES 30 and 32, is mounted near the top edge of the clamping plate 219. The limit switch 235 is electrically connected to the hydraulic circuit which actuates the cylinders 208 and 210. When the height of the stacked layers of containers reaches the level of the switch 235, the circuit is closed so that the hydraulic pressure to the cylinders 208 and 210 is increased to a predetermined value higher than the original value. The purpose of increasing the hydraulic pressure is to provide additional clamping force for holding the stacked container layers as the weight increases due to the stacking of successive layers.

In the foregoing description I have explained one embodiment of my invention wherein both jaws 212 and 213 are laterally movable to clamp one or more layers of containers. It will be obvious to those skilled in the art that this embodiment may be modified so that only one of the jaws 212 or 213 moves laterally in clamping the formed container layers.

The number of layers to be stacked one upon the other to make up a desired unit load will be controlled by the operator. Thus, the control panel 45 (FIGURE 2) will include a layer setting device 232 which will be in the form of a counter effective to count the cycles of operation of the clamping device. Thus, should the layer setting device be set for three cycles of operation, it will act to energize the mechanism for lowering or retracting the stop 186 just as the clamp jaws deposit the two lifted layers on the underlying third layer and move outwardly to release the load. This places the stack of three layers under the control of the second live roller conveyor which serves to move the stack beyond the stop 186 to a discharge station indicated generally at 233 from which the stack may be removed, as by means of a clamp lift truck, to a storage room or otherwise. The layer setting device 232 will include suitable timing mechanism effective to raise the stop 186 immediately upon the passage of the stack therebeyond, thus positioning it for receipt of the first layer in the next succeeding stack which will have been released by the stop 180. In this connection, it may be pointed out that suitable lock-out mechanism may be provided in the control circuit for the stops 180 and 186 so that stop 180 will not be lowered until the stop 186 is raised, although such mechanism is not necessary since the second conveyor section moves at the same lineal speed throughout its entire length and hence the exit speed of the stack will be the same as the delivery speed of the layer moving in back of it. It is also preferable to connect the circuits for the limit swiches 224 (on stop 186) and limit switch 230 (on the frame) in series so that even though the clamping jaws have moved to their lowermost position, thereby closing the limit switch 230, the jaws will not start on their inward movement until a new layer has moved into place and has contacted and closed limit switch 224.

Modifications may, of course, be made in my invention without departing from the spirit of it and I do not intend to be limited excepting as set forth in the claims which follow. For example, and with reference to FIGure 30, I have found it desirable to provide a brush 234 mounted above the leading end of the second roller conveyor which will contact the upper surfaces of the rows of containers as they are transferred to the second conveyor by the pusher bars. The transition sometimes involves jostling of the containers and I have found that the brushes will aid materially in steadying the containers and maintaining them in proper alignment. Similarly, it will be obvious to the skilled worker that various forms of mechanical, pneumatic, hydraulic or electrical actuating devices may be employed for the various operating components of the device and that the actuating or operating circuits for these components will vary accordingly. However, with these teachings as a guide the necessary circuit means for carrying out the objectives of the invention will be readily apparent to the skilled worker in the art.

While throughout these specifications I have referred to the objects being arranged and stacked as containers, it is to be understood that the term "containers" is used in a non-limiting sense and is inclusive of shipping cases, cartons, boxes and other containers for packages capable of being handled in accordance with the spirit and purpose of my invention.

Having thus described my invention in an exemplary embodiment, what I desire to secure and protect by Letters Patent is:

1. A device for arranging and stacking containers comprising container accumulating means, conveyor means for receiving containers from said accumulating means and advancing them in a path of travel, said accumulating means including control means at the discharge end thereof to discharge a predetermined number of containers onto said conveyor means, pattern forming means along the path of said conveyor means for selectively arranging the advancing containers in rows, said pattern forming means including a movable diverter for displacing containers laterally of said conveyor means, a turn-around for turning containers at right angles to their initial direction of movement, and a turn-over for turning containers on their sides, means for collecting and assembling the rows of containers into layers composed of a plurality of rows of containers, a stacking station, means for advancing each layer as it is formed to said stacking station, and clamp means at said stacking station for contacting and lifting the layers as they are delivered to said stacking station, whereby the next successive layer may be delivered beneath the first and the successive layers stacked beneath one another.

2. The device claimed in claim 1 including additional diverting means in advance of said pattern forming means for initially positioning and aligning containers moving along said conveyor means in a single row adjacent a side edge of said conveyor means, said pattern forming means being located along the said side edge of the conveyor and selectively operable to act upon the containers in the aligned row.

3. The device claimed in claim 2 wherein said conveyor means is composed of a plurality of conveyor sections, there being a first conveyor section extending between said accumulating means and said last named container diverting means, a second conveyor section adjacent said last named movable diverter, said second conveyor section moving at a lineal speed substantially greater than the lineal speed of said first conveyor section, whereby to space apart the advancing containers, and a third conveyor section in the area of said turn-around and said turn-over.

4. The device claimed in claim 3 wherein said first and second conveyor sections comprise belt conveyors and said third conveyor section comprises a live roller conveyor moving at a lineal speed substantially equal to the lineal speed of said second conveyor section.

5. The device claimed in claim 4 wherein said third conveyor section terminates in a row collecting station having a transversely disposed stop.

6. The device claimed in claim 5 wherein the means for collecting and assembling the rows of containers into layers includes a pusher movable transversely of said last named conveyor section to remove the formed rows of containers therefrom, and container actuated control means for said pusher.

7. A device for collecting and stacking a plurality of containers in a unit load comprising a continuously moving conveyor, accumulating means for delivering a predetermined number of containers to said conveyor, pattern forming means along said conveyor to selectively arrange the containers in rows, means for collecting the rows of containers and delivering them to a second conveyor, a second conveyor positioned to receive the rows of containers from said collecting means, said second conveyor including means for collecting the rows of containers to form them into layers each composed of a plurality of rows of containers, a layer stacking station, means for advancing the layers of containers to said layer stacking station, and stacking means at said stacking station comprising a vertically movable clamp mounting member, power actuated means for raising and lowering said clamp mounting member, a pair of horizontally movable clamping jaws attached to said mounting member, power actuated means for moving at least one of said clamping jaws toward and away from the other clamping jaw and control means for sequentially actuating both of said power actuated means to cause said clamping jaws to clamp a layer of containers at said stacking station, thereafter lift said layer and lower same for deposition on top of the next layer moved therebeneath, whereby a unit load comprising a plurality of layers may be stacked from the top down.

8. The device claimed in claim 7 wherein the means for collecting the rows of containers and forming them into layers comprises a retractable stop traversing said second conveyor.

9. The device claimed in claim 8 wherein the means for advancing the layers to said stacking station includes container actuated control means for retracting said retractable stop upon the formation of a complete layer of containers.

10. The device claimed in claim 9 including a second retractable stop at said stacking station to position the layers for engagement by said stacking means.

11. The device claimed in claim 10 including control means for predetermining the number of layers to be stacked, said last named control means being effective, upon the formation of the desired number of layers into a stack, to release said clamping jaws and retract said second retractable stop, whereby said stack may be moved to a discharge station.

12. In a device for collecting and stacking a plurality of containers, a first station for forming rows of containers in which the containers are selectively arranged relative to each other in a predetermined pattern, a second station for collecting the rows of containers so formed into layers composed of a plurality of rows, means for advancing the rows of containers from the first to the second station, a third station for stacking the layers of containers one upon another, means for advancing the formed layers of containers from said second to said third station, said third station including a carriage support, a carriage member mounted for vertical reciprocation on said support, power actuated means for reciprocating said carriage member, a pair of spaced clamp mounting members attached to said carriage member, power actuated means for moving said clamp mounting members horizontally with respect to each other, at least one clamping plate including articulated mounting means attached to each of said clamp mounting members, and control actuating means for moving said clamping plates and said vertically movable carriage member in sequence to first clamp a layer composed of a plurality of containers, thereafter lift said layer until a second layer is advanced to said third station beneath the raised layer and thereafter deposit the raised layer on said second layer, whereby a unit load composed of a plurality of layers of containers may be stacked from the top down by repeating the control sequence as many times as necessary.

13. In a device for collecting and stacking a plurality of containers, a first station for forming rows of containers in which the containers are selectively arranged relative to each other in a predetermined pattern, a second station for collecting the rows of containers into layers each composed of a plurality of rows, means for advancing the rows of containers from the first to the second station, a third station for stacking the layers one upon another, means for advancing the formed layers from said second to said third station, layer lifting means at said third station, said layer lifting means including clamping jaws engageable with opposite sides of the layers and adapted to raise and lower same, actuating means for causing said jaws to deposit the previously lifted layers on top of each successive layer presented to said third station and thereafter engage and lift the combined layers, whereby a plurality of said layers may be built up and held by said clamping jaws until the desired number of layers have been stacked beneath one another, and means for releasing the stack so formed and delivering it to a discharge station.

14. In apparatus for forming a unit load of containers, conveyor means for sequentially delivering preformed layers of containers to a stacking station, lifting means at said stacking station for engaging and lifting the layers upon delivery to said stacking station thereby permitting each successive layer to be delivered beneath the lifted layers, said lifting means including a pair of articulated clamping jaws positioned to engage opposite sides of the layers, said clamping jaws being attached to a vertically reciprocable carriage member mounted for movement on a support, power actuated means for causing reciprocating movement of said carriage member, additional power actuated means for moving the clamping jaws into and out of engagement with the container layers, and control means for sequentially actuating said last named means to cause the clamping jaws to clamp a first layer composed of a plurality of containers, lift said layer by actuating the power actuated means associated with said vertically reciprocable carriage member, and thereafter lower said lifted layer and deposit it on top of a second layer after it is moved into position at said stacking station beneath the elevated layer, said control means acting to repeat said control sequence until a unit load of a predetermined number of layers is built up.

15. A machine for assembling containers in layers of at least two containers each, there being at least two layers in each assembly, comprising conveyor means to receive a succession of containers, retractable stop means extending transversely of said conveyor against which said containers are formed into layers, actuating means for retracting said stop means to permit a formed layer to advance along said conveyor, a second retractable stop beyond said first stop means, and clamp lift means adjacent said second retractable stop, said clamp lift means comprising a support, a carriage member mounted for vertical movement on said support, power actuated means for raising and lowering said carriage member, a pair of horizontally movable clamp mounting members attached to said carriage member, at least one clamping plate mounted on each of said clamp mounting members and clamp actuating means effective upon movement of a formed layer against said second stop to cause the clamping plates to engage and raise the said layer so that the following layer may be positioned beneath the layer just lifted, the power actuated means for raising and lowering said carriage member then being actuated to deposit the lifted layer on top of the layer presented therebeneath and thereafter engaging and lifting both of said layers, whereby successive layers may be stacked from the top down.

16. Apparatus for forming a unit load of containers comprising in combination a conveyor, a supporting frame mounted astraddle said conveyor, a vertically reciprocable carriage member mounted on said supporting frame, power actuated means for raising and lowering said carriage member, a clamp including jaws mounted for horizontal clamping movement on said vertically reciprocable member, a first stop for collecting a plurality of containers on said conveyor until a layer of containers has been formed, means for lowering said first stop, a second stop for holding a formed layer of containers between the jaws on said clamp, means for actuating at least one of said jaws to grip a layer of containers held by said second stop, and means for actuating the power actuated means for raising said vertically reciprocable carirage member and said clamp after its jaws have engaged the said last named layer, whereby to elevate the said layer so that the next successive layer may be moved therebeneath, and means for thereafter lowering the clamp to superpose the layers one upon the other.

17. The apparatus claimed in claim 16 including means for determining the number of layers to be stacked one upon the other, and means effective, when said number of layers has been reached, to lower said second stop and release the stacked layers of containers for movement along said conveyor.

18. In a device for feeding containers to a stacking station and for stacking the containers in a plurality of superposed layers, a conveyor, said conveyor having a first section for receiving individual rows of containers from a source of supply, means at the end of said first conveyor section for collecting a plurality of rows to form a layer of containers composed of a plurality of such rows, a layer stacking station forming a second section of said conveyor, means for advancing a formed layer of containers from said first conveyor section to said second conveyor section, and layer lifting means at said stacking station, said lifting means including a pair of jaws, actuating means for at least one of said jaws operable upon movement of the formed layer to said stacking station to grip opposite sides of said layer and lift it bodily upwardly, means for maintaining said jaws in the lifted position until the next successive layer is moved to said stacking station beneath said first layer, and means for thereafter lowering said lifting means so as to bring said first named layer into contact with the upper surface of said next successive layer, and means operable to thereafter release said jaws for lifting engagement with said next successive layer, whereby both of said layers may be lifted and the stacking station cleared for receipt of yet another layer.

19. The device claimed in claim 18 including a third conveyor section extending beyond said stacking station, and means for releasing stacked layers of containers for movement from said stacking station along said third conveyor section, said third conveyor section comprising a discharge station from which said stacked layers may be conveniently removed.

20. A container stacking apparatus comprising a supporting frame mounting a pair of spaced apart vertically disposed masts, a vertical channel in each of said masts, a carriage mounted by means of rollers in said vertical channels, power actuated means for raising and lowering said carriage, a plurality of horizontally disposed tubular sleeve members mounted on said carriage, a plate secured to said tubular sleeve members at their ends, a plurality of rods slidable in said tubular sleeve members, said rods being arranged in pairs for opposite movement in their respective sleeve members, a clamp mounting member secured to the ends of opposed pairs of rods, power actuated means connected to each of said clamp mounting members at one end and to said end plates at the other for moving said clamp mounting members toward and away from each other, a forked clamping arm mounted on each of said clamp mounting members, a bracket member pivotally articulated between the forked arms of said clamping arm, a pair of clamping plates mounted on said bracket member with a resilient pad interposed to permit articulated movement of said clamping plates and control means for sequentially causing said clamping means to clamp a layer composed of a plurality of containers, thereafter lift said layer and lower same for deposition on top of a second layer moved therebeneath whereby a unit load comprising a plurality of layers of containers may be stacked.

21. Apparatus for stacking containers into multiple layers wherein each layer is composed of a plurality of containers comprising a supporting frame, a pair of spaced vertically disposed masts mounted on said frame, each of said masts having a channel for receiving rollers, a carriage having rollers extending from its sides, said rollers being received in said channels, means for raising and lowering said carriage, a plurality of horizontally disposed tubular sleeve members mounted on said carriage, a plurality of rods engaging said tubular sleeve members for sliding movement therewithin, some of said rods having their exposed ends projecting horizontally in one direction and the remaining rods having their exposed ends projecting horizontally in the opposite direction, a clamp mounting member attached to each of the exposed ends of said rods, power actuated means for sliding said rods in said tubular sleeve members thereby causing the clamp mounting members to be moved toward and away from each other, a clamping jaw mounted on each of said clamp mounting members and control means for sequentially actuating said carriage and clamp mounting members whereby a layer of containers is clamped between the clamping jaws, then raised to permit a second layer of containers to be placed beneath the lifted layer, then lowered to deposit the lifted layer on the lower layer whereafter the clamping jaws are opened, then lowered to engage and raise the combined layers whereby a unit load may be stacked by repeating this cycle as necessary.

22. A container stacking apparatus comprising a supporting frame mounted astraddle a conveyor section, a pair of vertically disposed masts secured to said supporting frame, a carriage mounted for vertical movement in said masts, means for raising and lowering said carriage, a plurality of tubular sleeve members attached to said carriage, a rod member slidably mounted in each of said tubular sleeve members, some of said rod members having a clamp mounting member attached to their ends on one side of said carriage and the remaining rod members having a second clamp mounting member attached to their ends on the other side of the side carriage, power actuated means attached to at least one of said clamp mounting members at one end and said carriage at the other and adapted to move the clamp mounting members toward and away from each other, a clamping jaw attached to each of said clamp mounting members and having a high friction clamping surface to prevent slippage of the container surfaces when clamping and lifting a layer of containers and control means for sequentially actuating the clamping jaws to engage a layer of containers, then raise the carriage to raise said layer and permit a second layer to be moved into position below the raised layer, then lower and deposit the raised layer on top of the second layer, then open the clamping jaws and lower same whereby the layers of containers may be stacked from the top down to form a unit load by repeating the stacking cycle as many times as necessary.

23. Apparatus for stacking containers into multiple layers wherein each layer is composed of a plurality of containers comprising a supporting frame, a carriage mounted for vertical movement on said frame, means for raising and lowering said carriage, a plurality of tubular sleeve members mounted on said carriage, a plate secured to the ends of said tubular sleeve members, a plurality of rods slidable in said tubular sleeve members, said rods being arranged in pairs for opposite movement in their respective sleeve members, a clamp mounting member secured to the ends of opposed pairs of rods, power actuated means connected to each of said clamp mounting members at one end and to one of said end plates at the other for moving said clamp mounting members toward and away from each other, a forked clamping arm mounted on each of said clamp mounting members, a bracket member pivotally articulated between the forked arms of said clamping arm, a pair of clamping plates mounted for articulated movement on said bracket member, and control means for sequentially causing said clamping plates to clamp a layer composed of a plurality of containers, thereafter lift said layer and then lower same for deposition on top of another layer whereby a unit load comprising a plurality of layers may be stacked.

24. In apparatus for forming a unit load of containers, conveyor means for sequentially delivering layers of containers to a stacking station, lifting means at said stacking station for engaging and lifting the layers upon delivery to said stacking station thereby permitting each successive layer to be delivered beneath the lifted layers, said lifting means including a pair of clamping jaws positioned to engage opposite sides of the layers, said clamping jaws being attached to a vertically reciprocable carriage member mounted for movement on a support, power actuated means for causing reciprocating movement of said carriage member, additional power actuated means for moving the clamping paws into and out of engagement with the container layers, and control means for sequentially actuating said last named means to cause the clamping jaws to clamp a first layer composed of a plurality of containers, lift said layer by actuating the power actuated means associated with said vertically reciprocable carriage member, and thereafter lower said lifted layer and deposit it on top of a second layer after it is moved into position at said stacking station beneath the elevated layer, said control means acting to repeat said control sequence until a unit load of a predetermined number of layers is built up.

25. A machine for assembling containers in a stack composed of at least two layers, comprising mechanical means to receive a succession of containers from a conveyor to sequentially form a succession of layers for a clamping station, each of said layers comprising at least two containers and having substantially the same overall lateral dimensions, clamp lift means including a pair of clamping jaws at said clamping station for engaging opposite sides of layers at the clamping station and capable of clamping, raising and then lowering each such layer and depositing it on each succeeding layer as each such succeeding layer is positioned beneath the clamping jaws until a complete stack is formed, said clamp lift means being mounted on a vertically movable support member, means for moving said clamping jaws horizontally into and out of clamping engagement with the container layers, means for raising and lowering said vertically movable support, and control means for raising and lowering the clamping jaws so that at least one lifted layer is raised and then lowered on top of the layer which is to form the bottom layer of a finished stack of containers.

References Cited in the file of this patent

UNITED STATES PATENTS

| | | |
|---|---|---|
| 2,028,697 | Rapisarda | Jan. 21, 1936 |
| 2,585,697 | Sommer et al. | Feb. 12, 1952 |
| 2,598,222 | Cahners et al. | May 27, 1952 |
| 2,648,181 | Dalton | Aug. 11, 1953 |
| 2,703,182 | Broberg et al. | Mar. 1, 1955 |
| 2,716,497 | Wahl et al. | Aug. 30, 1955 |
| 2,744,369 | Seragnol | May 8, 1956 |
| 2,745,535 | Schlegel | May 15, 1956 |

UNITED STATES PATENT OFFICE
CERTIFICATE OF CORRECTION

Patent No. 2,997,187                                              August 22, 1961

Robert V. Burt

It is hereby certified that error appears in the above numbered patent requiring correction and that the said Letters Patent should read as corrected below.

Column 9, line 63, for "158" read -- 148 --; column 11, line 36, for "illustrattd" read -- illustrated --; column 16, line 50, for "carirage" read -- carriage --; column 18, line 62, for "paws" read -- jaws --.

Signed and sealed this 30th day of January 1962.

(SEAL)
Attest:

ERNEST W. SWIDER
Attesting Officer

DAVID L. LADD
Commissioner of Patei